March 19, 1974 B. SCHWARTZ 3,798,139

ELECTROLYTIC OXIDATION OF GALLIUM CONTAINING COMPOUND SEMICONDUCTORS

Filed Sept. 25, 1972 2 Sheets-Sheet 1

United States Patent Office 3,798,139
Patented Mar. 19, 1974

3,798,139
ELECTROLYTIC OXIDATION OF GALLIUM CONTAINING COMPOUND SEMICONDUCTORS

Bertram Schwartz, Westfield, N.J., assignor to Bell Telephone Laboratories, Incorporated, Murray Hill, N.J.

Continuation-in-part of abandoned application Ser. No. 207,052, Dec. 13, 1971. This application Sept. 25, 1972, Ser. No. 292,127
Int. Cl. C23b *11/00*
U.S. Cl. 204—56 R 28 Claims

ABSTRACT OF THE DISCLOSURE

Electrolytic oxidation systems are described for growing an amorphous oxide layer on the surface of a gallium containing compound semiconductor. The electrolyte comprises either $H_2O$ adjusted to an acidic or basic pH range or an $H_2O_2$ solution. Utilizing these systems, oxide thicknesses of greater than 1000 angstroms can be grown in relatively short periods of time.

CROSS REFERENCE TO RELATED APPLICATION

This application is a continuation-in-part of my copending U.S. application Ser. No. 207,052, filed Dec. 13, 1971, now abandoned, and assigned to the same assignee.

BACKGROUND OF THE INVENTION

This invention relates to electrolytic systems for growing amorphous native oxide films on gallium containing compound semiconductors.

The growth of a stable amorphous native oxide on gallium containing compounds has been observed only recently. (See U.S. patent application of R. Hartman-M. Kuhn-B. Schwartz, Ser. No. 141,964, filed May 10, 1971 now abandoned, and assigned to the present assignee.) The importance of this oxide film has been demonstrated in the field of light-emitting p-n junction devices. When the oxide is grown on the surface of the device, the operating life of the device is significantly increased.

The method now employed to produce the oxide involves immersing the device in a hot oxidizing solution such as $H_2O_2$ for a period of several hours until a film a few hundred angstroms thick is observed. It will be appreciated that this is a fairly slow process. It has also been observed that when the carrier concentration of certain semiconductor materials such as GaAs is too low, oxidation may occur even more slowly if at all.

Thus, while the prior art method is adequate, it is generally desirable to speed the oxidation process to facilitate commercial production. It is also desirable to make the oxidation essentially independent of the doping of the semiconductor material. Finally, if a method could be provided which produced much thicker native oxides than possible under the present method, the oxide could be used to perform other functions generally associated with insulating material in integrated circuit technology, for example, impurity diffusion masking, insulating from beam lead contacts and forming metal-oxide-compound semiconductor structures.

SUMMARY OF THE INVENTION

These and other objects are achieved in accordance with the invention which involves producing the amorphous oxide layer by means of certain electrolytic systems. An $H_2O_2$ or $H_2O$ solution adjusted to an acidic or basic pH range may be used as the electrolyte. A self-limiting growth process may be established by applying a constant potential to the system and allowing the current through the electrolytic cell to decrease asymptotically to some predetermined value.

In a particular embodiment employing an $H_2O_2$ solution at room temperature, an oxide thickness of several thousand angstroms was produced in 30 minutes on a GaP sample.

BRIEF DESCRIPTION OF THE DRAWING

These and other features of the invention will be delineated in detail in the description to follow. In the drawing.

DETAILED DESCRIPTION OF THE INVENTION

Figure 1:
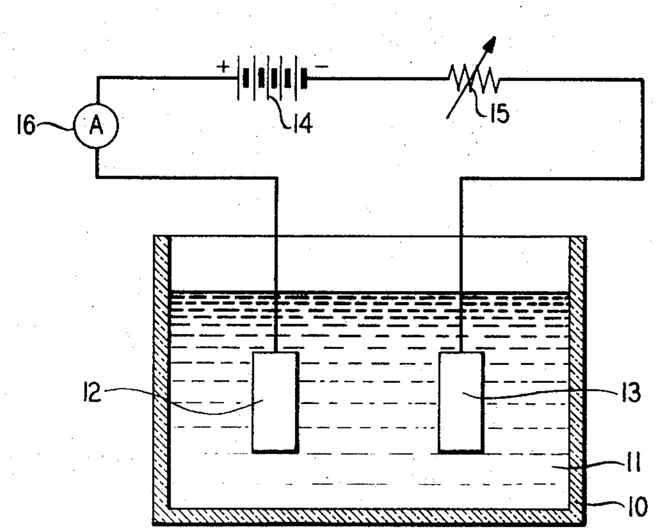
FIG. 1 is a schematic drawing showing an electrolytic oxidation system in accordance with one embodiment of the invention.

FIG. 1 demonstrates schematically an electrolytic system utilized to practice the invention. Within an ordinary container, 10, is contained the liquid, 11, comprising the electrolyte. The gallium containing compound semiconductor material, 12, is immersed in the solution along with an electrode, 13, comprising one of the noble metals such as platinum or gold. Coupled to these samples are a D.C. current source, 14, and a variable resistance, 15, which together comprise a constant voltage source. The semiconductor material is made the anode and the noble metal the cathode of the electrolytic system. Included in the circuit is an ammeter, 16, for measuring the current through the cell.

The electrolyte chosen in accordance with the invention is either a hydrogen peroxide and water solution or simply water alone provided the pH of the latter is adjusted as described below. The $H_2O_2$ solution is conveniently 30 percent by weight, although a range of 3–90 percent by weight would be useful.

In a particular embodiment, slices of liquid encapsulated Czochralski grown n-type GaP were chem-mechanically polished in bromine-methanol solution and made the anode of the cell. The electrolyte was a 30 percent aqueous $H_2O_2$ solution. The cathode was platinum. Electrolytic oxidations were performed for different values of the applied potential at room temperature for a period of approximately 2000 seconds. The slices were then dried by heating to 250° C. for approximately three hours in a nitrogen ambient. It was noted that an amorphous form of native oxide was grown on the surface of the samples. The thickness of the oxide layer and the refractive index were measured for each run and the results are reproduced in the following table:

| Voltage (volts) | Thickness (A.) | Refractive index |
|---|---|---|
| 10 | 125 | 1.70–1.75 |
| 25 | 300 | 1.70–1.75 |
| 50 | 525 | 1.68 |
| 100 | 1,230 | 1.63 |
| 160 | 3,500 | ~1.2 |

The remarkable growth rate produced by this electrolytic oxidation system should be immediately obvious. Whereas in the prior art chemical system a film thickness of only 300–400 angstroms is produced after approximately seven hours, in accordance with the present electrolytic process, for example, a film thickness of 3500 angstroms is produced after approximately 33 minutes with an applied potential of 160 volts. In addition to the advantage of having a greater oxidation rate, this process results in films which are thick enough to be used in the production of gallium containing compound semiconductor integrated circuits and to provide the necessary insulation in such circuits.

A useful range of applied potential is approximately 5–175 volts. Higher applied potentials may be employed in the system with some modifications. For example, it was observed that when 225 volts was supplied, cracks developed in the oxide surface. This problem is avoided by using a pulsed D.C. potential such that the cell is pulsed on for ⅓ of a cycle and off for the remaining ⅔ of a cycle. Such a procedure produced an oxide thickness which gave an interference color in the purplish range. This indicates a thickness in excess of 4000 angstroms. The problem may also be avoided by raising the temperature of the electrolyte to near the boiling point. The resulting motion of the solution should prevent depletion of the reagent at the semi conductor interface, provide additional free charged carriers in the GaP, and allow uninhibited growth of the oxide.

If a drying cycle is desired, a useful range appears to be 150–250° C. temperature for one-half hour to five hours in a nitrogen atmosphere.

Figure 2:
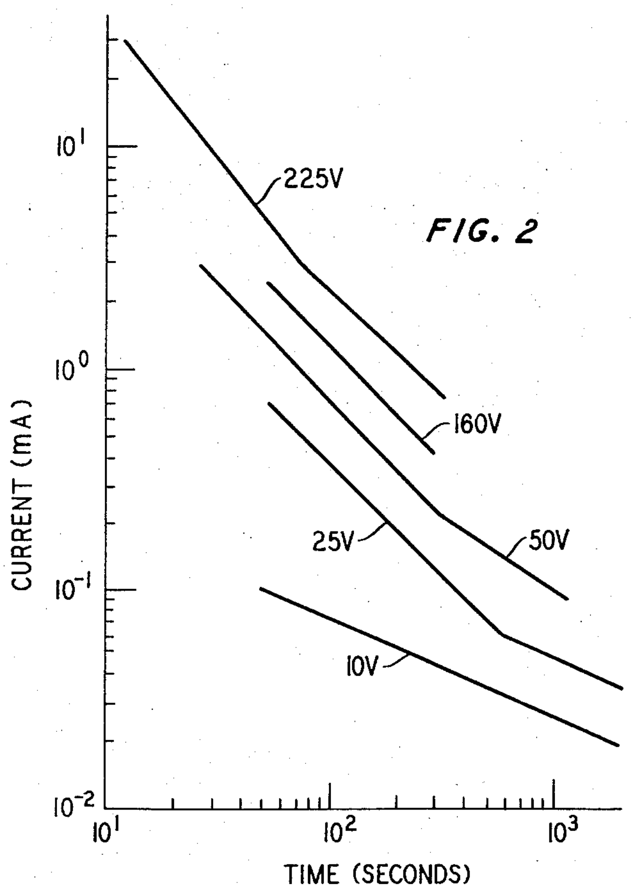
FIG. 2 is a graph of current through the system as a function of time for several applied potentials in accordance with the same embodiment.

During each oxidation, the current passing through the cell was also measured and the results for each applied potential are reproduced in the graph shown in FIG. 2. The decreasing current demonstrates the fact that the oxide is growing and causing an increasing resistance in the cell. Once the resistivity of the film is measured, therefore, the time required to produce a predetermined oxide thickness can be calculated for each applied voltage. FIG. 2 also suggests that a self-limiting growth process may be established. That is, due to the increased resistance provided by the growing oxide, the current through the cell will decrease asymptotically to some small value, at which time the growth of the oxide will virtually cease. It is expected that this asymptotic value is approximately $10^{-2}$ milliamperes. It may also be desirable to provide a constant current source rather than a constant voltage source in the system. In such a case, the current would be supplied until the voltage reached a predetermined value for a particular oxide thickness desired.

It should be recognized that although invention has been described primarily in relation to the oxidation of n-type GaP, the method may be applied to other materials. For example, p-type GaP was oxidized according to the precedure described above and substantially the same current-time curves were obtained. GaAs may also be oxidized in accordance with this process. For example, an n-type GaAs slice with a carrier concentration of approximately $2\times10^{17}$/cm.$^2$ was made the anode of the same electrolytic system. The electrolyte was again a 30 percent aqueous solution of $H_2O_2$. When a constant potential of 100 volts was supplied to the system, an oxide approximately 1100 A. thick was grown in just ten minutes. It is important to note that since free carriers are being supplied by the electrolytic system in the form of the voltage or current source, the lower limit of carrier concentration in GaAs of $2\times10^{17}$/cm.$^{-2}$ which permitted oxidation in the prior art method is not applicable here. (See application of Hartman, Kuhn and Schwartz, supra.)

Figure 3:
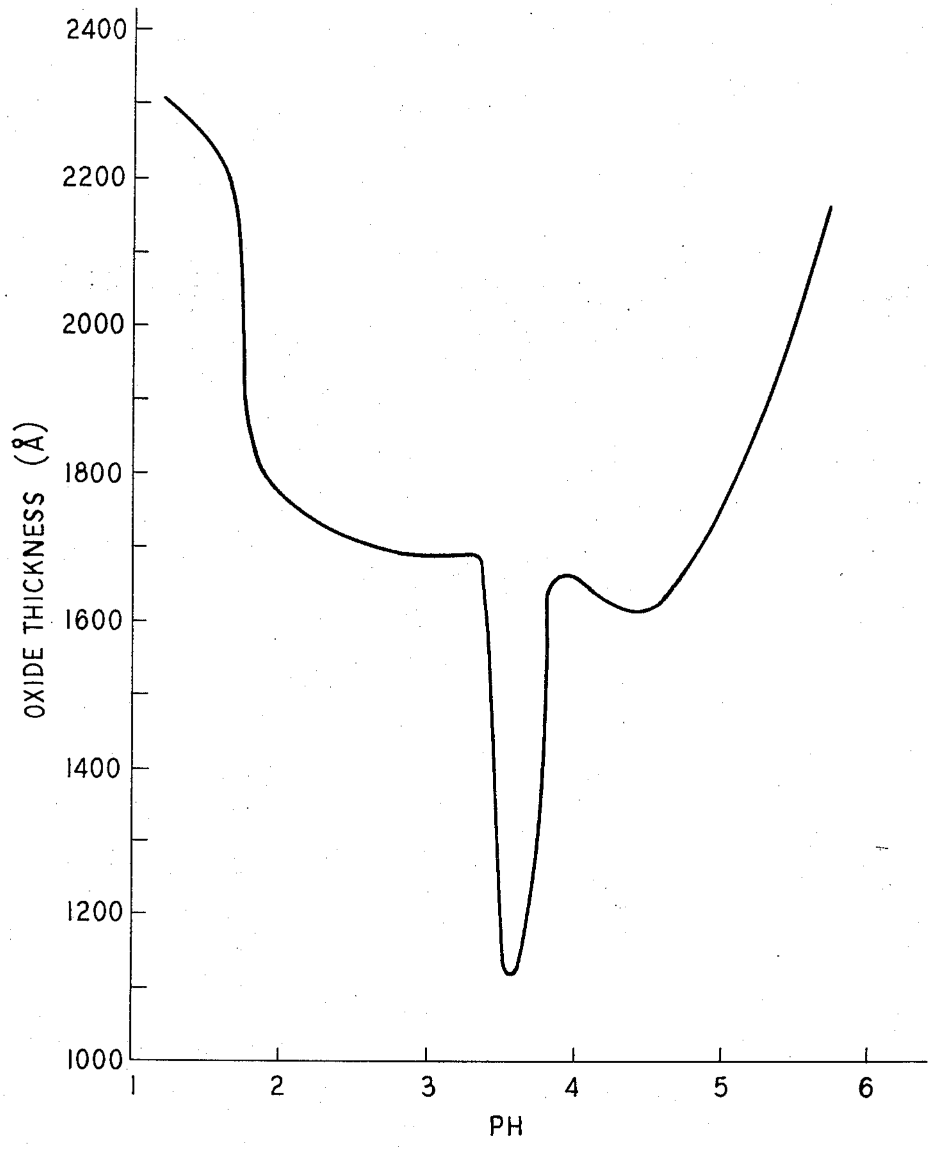
FIG. 3 is a graph of the thickness of oxide grown on several samples in accordance with one embodiment of the invention as a function of the pH of the electrolyte.

It is was also discovered in the GaAs oxidation systems that the pH of the electrolyte can have a bearing on the growth rate of the oxide. It was found that the standard chemically pure grade $H_2O_2$ solution used in the above GaAs oxidation had a pH of approximately 3.5. The pH of the solution was decreased to approximately 2 by the addition of 0.2 cc. of $H_3PO_4$ to approximately one-half liter of solution. The oxidation was repeated using a constant potential of 100 volts. After ten minutes, an oxide approximately 1750 A. thick was grown on the slice. Similarly, when the pH was increased by the addition of a suitable source of hydroxyl ions, such as $NH_4OH$, the growth rate was similarly increased. The results of these experiments are reproduced in the graph of oxide thickness versus pH shown in FIG. 3. All oxidations were performed at a constant potential of 100 volts for ten minutes. It was also found that at pH within the range 6–8, etching occurs, i.e., the oxide tends to dissolve in the solution. However, when the pH is raised to within the range 8–13, a stable oxide will again form as when the pH was in the acidic range.

In a further embodiment, GaAs may also be oxidized in an electrolyte of water alone. Here, the pH of the solution also has an effect on oxide growth. When slices of n-type GaAs were made the anode of systems where the electrolyte was water at pH=5–9 and a constant potential of 100 volts was applied, no fall-off in current was observed after approximately ten minutes. This indicates that most of the oxide which was formed was dissolved and so that film was worthless as an insulator or as a barrier to outside contaminants. However, when the pH of water was lowered to a pH range of 1–5 by the addition of a source of hydrogen ions such as $H_3PO_4$ or $H_2SO_4$, the system produced oxides which show a current decrease similar to those illustrated in FIG. 2. The same results were achieved when the pH of water was raised to 9–13 by a source of hydroxy ions such as $NH_4OH$. Thus, in accordance with the invention, GaAs may be oxidized electrolytically in a system where water is the electrolyte provided the pH is adjusted to within the ranges described above.

In general, it is to be expected that any semiconductor compound containing an appreciable amount of gallium (i.e., at least 5 percent) will form the amorphous native oxide when treated in accordance with the present invention. Other possible materials include GaAlAs, AlGaP, InGaP, InGaAs and mixtures thereof.

Various additional modifications and extensions of this invention will become apparent to those skilled in the art. All such variations and deviations which basically rely on the teachings through which this invention has advanced the art are properly considered within the scope and spirit of this invention.

What is claimed is:

1. A method of forming an oxide on the surface of a gallium containing compound semiconductor comprising making the semiconductor the anode in an electrolytic cell wherein the electrolyte comprises an aqueous solution of $H_2O_2$ and passing a current through said electrolytic cell.

2. The method according to claim 1 wherein a constant potential is applied to said cell until the current flow through the cell decreases to some predetermined value due to the electrical resistance of the resulting oxide film.

3. The method according to claim 1 wherein a constant current is supplied to said cell until the voltage across the cell increases to some predetermined value due to the electrical resistance of the resulting oxide film.

4. The method according to claim 1 wherein the applied potential is a pulsed D.C. potential.

5. The method according to claim 1 wherein the temperature of the electrolyte is held near the boiling point of said solution.

6. The method according to claim 1 wherein the gallium compound is selected from the group consisting of GaP, GaAs, GaAlAs, AlGaP, InGaP, and InGaAs.

7. The method according to claim 1 wherein the gallium compound is GaP.

8. The method according to claim 7 wherein the applied potential lies within the range of 5–175 volts.

9. The method according to claim 1 wherein the gallium compound is GaAs.

10. The method according to claim 9 wherein the pH of the solution is within the ranges 1–6 and 8–13.

11. A method of forming an oxide on the surface of a gallium containing compound semiconductor comprising making the semiconductor the anode in an electrolytic cell wherein the electrolyte consists essentially of an aqueous solution of $H_2O_2$, and passing a current through said electrolytic cell.

12. The method according to claim 11 wherein a constant potential is applied to said cell until the current flow through the cell decreases to some predetermined value due to the electrical resistance of the resulting oxide film.

13. The method according to claim 11 wherein a constant current is supplied to said cell until the voltage across the cell increases to some predetermined value due to the electrical resistance of the resulting oxide film.

14. The method according to claim 11 wherein the applied potential is a pulsed D.C. potential.

15. The method according to claim 11 wherein the temperature of the electrolyte is held near the boiling point of said solution.

16. The method according to claim 11 wherein the gallium compound is selected from the group consisting of GaP, GaAs, GaAlAs, AlGaP, InGaP, and InGaAs.

17. The method according to claim 11 wherein the gallium compound is GaP.

18. The method according to claim 17 wherein the applied potential lies within the range of 5–175 volts.

19. The method according to claim 11 wherein the gallium compound is GaAs.

20. The method according to claim 19 wherein the pH of the solution is within the ranges 1–6 and 8–13.

21. A method of forming an oxide on the surface of a gallium containing compound semiconductor comprising making the semiconductor the anode in an electrolytic cell wherein the electrolyte consists essentially of water which has been adjusted to pH within the ranges 1–5 and 9–13 with ions effective for adjusting pH, and passing a current through said electrolytic cell.

22. The method according to claim 21 wherein a constant potential is applied to said cell until the current flow through the cell decreases to some predetermined value due to the electrical resistance of the resulting oxide film.

23. The method according to claim 21 wherein a constant current is supplied to said cell until the voltage across the cell increases to some predetermined value due to the electrical resistance of the resulting oxide film.

24. The method according to claim 21 wherein the applied potential is a pulsed D.C. potential.

25. The method according to claim 21 wherein the temperature of the electrolyte is held near the boiling point of said solution.

26. The method according to claim 21 wherein the gallium compound is GaAs.

27. The method according to claim 21 wherein the water is adjusted to a pH in the range 1–5 by a material selected from the group consisting of $H_2SO_4$ and $H_3PO_4$.

28. The method according to claim 21 wherein the pH of the water is adjusted to a pH in the range 9–13 by $NH_4OH$.

References Cited

FOREIGN PATENTS 1,176,928 1/1970 Great Britain ______ 204—56 R

HOWARD S. WILLIAMS, Primary Examiner

R. L. ANDREWS, Assistant Examiner